May 27, 1952     D. W. KELBEL     2,598,179
TRANSMISSION
Filed Dec. 21, 1944
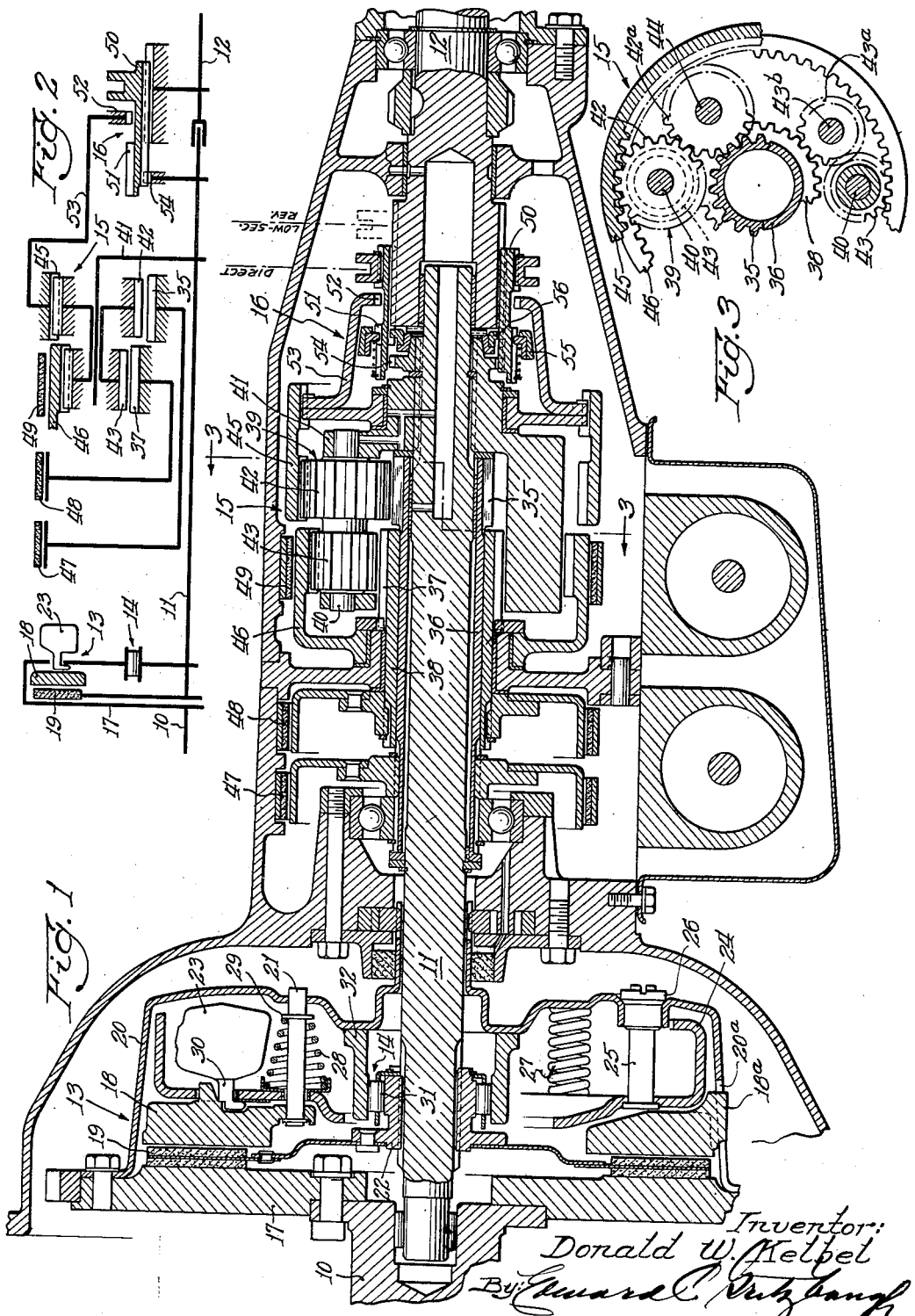
Inventor:
Donald W. Kelbel Patented May 27, 1952

2,598,179

UNITED STATES PATENT OFFICE 2,598,179

TRANSMISSION

Donald W. Kelbel, Muncie, Ind., assignor to Borg-Warner Corporation, Chicago, Ill., a corporation of Illinois Application December 21, 1944, Serial No. 569,130

16 Claims. (Cl. 74—761)

My invention relates to transmissions and more particularly to transmissions comprising planetary gearing.

It is an object of my invention to provide an improved transmission of this type which is compact and which is simple in construction and may be economically manufactured.

It is another object of my invention to provide an improved transmission of this type which has three speeds, low, intermediate and high speeds, and which may be shifted from low to intermediate speeds by engaging and disengaging friction type brakes and which may be shifted from intermediate to high speeds by shifting a positive type clutch. It is contemplated that the positive type clutch preferably shall have blocker mechanism associated therewith to prevent a shift of the clutch until the elements to be coupled thereby are in synchronism.

The invention consists of the novel constructions, arrangements and devices to be hereinafter described and claimed for carrying out the above stated objects and such other objects as will appear from the following description of a certain preferred embodiment illustrated in the accompanying drawings, wherein:

Fig. 1 is a longitudinal sectional view of a transmission embodying the principles of the invention;

Fig. 2 is a diagrammatic illustration of the transmission shown in Fig. 1; and

Fig. 3 is a sectional view taken on line 3—3 of Fig. 1.

Like characters of reference designate like parts in the several views.

Referring now to the drawing, the illustrated transmission comprises an input shaft 10, an intermediate shaft 11 and an output shaft 12. The shaft 10 may be connected with any suitable driving engine (not shown), and the shaft 12 may be connected with the driving wheels of a vehicle in which the transmission is installed. The intermediate shaft 11 is piloted in both of the shafts 10 and 12, as shown. A centrifugal clutch 13 and a free-wheeling clutch 14 are provided for connecting the shafts 10 and 11. Planetary gearing 15 and a positive type clutch 16 are provided for effectively connecting the intermediate shaft 11 and the output shaft 12, as will be hereinafter described.

The centrifugal clutch 13 comprises the ordinary flywheel 17 for an internal combustion engine (not shown) which is connected with the shaft 10, a pressure plate 18 and a driven clutch disc 19. The pressure plate 18 is connected with the flywheel 17 so as to be rotatable therewith by means of a clutch cover 20 bolted to the flywheel, studs 21 fixed with respect to the pressure plate 18 and extending through appropriate openings in the cover and ears 18a formed on the pressure plate 18 and extending through suitable slots 20a provided in the cover 20. The studs 21 are slidably disposed in their openings in the cover so that the pressure plate 18 may move toward the flywheel 17 to clamp the clutch disc 19 therebetween for thereby engaging the clutch. The clutch disc 19 is fixed to the intermediate shaft 11 by means of its hub 22 splined to the shaft 11.

The pressure plate 18 is moved toward the flywheel 17 to engage the clutch 13 in response to increase in speed of the input shaft 10, and such engagement is due particularly to the action of centrifugal weights 23 which rotate with the shaft 10. An intermediate plate 24 is provided within the cover 20, and this plate is adjustably fixed with respect to the cover by means of bolts 25 extending through the plate 24 and the cover 20. The bolts 25 are provided with nuts 26 fitting within suitable openings in the cover 20, and the nuts 26 may be adjusted for moving the plate 24 toward or away from the flywheel 17. Springs 27 are provided between the plate 24 and the cover 20 for yieldingly holding the plate 24 disposed in the position in which it is shown in the drawing. Springs 28 are provided effectively between the plate 24 and collars 29 on the studs 21, and these springs function to yieldingly hold the plate 24 and pressure plate 18 together.

The weights 23 are formed with lever portions 30, and these portions extend through the plate 24 and into contact with the pressure plate 18 and function to hold the plates 18 and 24 apart. The plate 24 and the weights 23 rotate with the cover 20 and flywheel 17 due to the connection between the plates by means of the bolts 21 and 25, and as the speed of the shaft 10 increases, the weights 23 move outwardly. On such outward movement of the weights, the lever portions 30 of the weights function to pry the plates 18 and 24 apart and to clamp the friction plate 19 between the plate 18 and flywheel 17 to engage the clutch, as is apparent from an inspection of the form of the lever portions 30 in the drawing. The movement of the plates 18 and 24 apart is against the action of the springs 28, and the reaction on the plate 24 is taken by the springs 27 between the plate and the cover 20. The clutch 13 is thus engaged to couple the shafts 10 and 11 on the speed of the former shaft increasing sufficiently.

The one-way clutch 14 comprises rollers 31 disposed between the hub 22 and a cylindrical portion 32 fixed with respect to the cover 20. The hub 22 and portion 32 are formed with cams (not shown) on their inner surfaces which are of such shape that the rollers 31 will not engage between the hub and cylindrical portion when a drive is from the shaft 10 to the driven shaft 11; however, the rollers 31 will engage if the driven shaft 11 is rotated in the forward direction while the shaft 10 does not rotate. The overrunning clutch 14 thus assures a drive from the shaft 11 to the shaft 10 if the engine (not shown) for driving the shaft 10 is inoperative.

The planetary gear set 15 comprises a sun gear 35 formed on a sleeve 36 and another sun gear 37 which is formed on a sleeve 38. The sleeve 36 is journaled on the shaft 11, and the sleeve 38 is rotatably disposed on the sleeve 36. A dual pinion gear 39 is journaled on a shaft 40 which is fixed in a planet gear carrier 41. The carrier 41 is splined on the shaft 11 to rotate therewith. The dual pinion 39 comprises a large pinion 42 and a small pinion 43, and the large pinion 42 is in mesh with a large pinion 42a and the small pinion 43 is in mesh with a small pinion 43a. The pinions 42a and 43a are individually mounted on the carrier 41 by means of shafts 44 and 43b respectively. The large pinion 42 is in mesh with a ring gear 45 which is rotatably disposed with respect to the carrier 41 and the shaft 11, and the small pinion 43 is in mesh with a ring gear 46 which is also rotatably disposed with respect to the carrier 41 and shaft 11. The large pinion 42a is in mesh with the sun gear 35, and the small pinion 43a is in mesh with the sun gear 37. The two sun gears 35 and 37 and their sleeves 36 and 38 constitute reaction elements for completing power trains through the gearing, and friction brakes 47 and 48 are provided for the sleeves 36 and 38 respectively, so that these sleeves may function in this manner. The brakes 47 and 48 may be operated by any suitable operators. The ring gear 46 also constitutes a reaction element for completing a power train through the gearing, and a brake 49 is provided for this ring gear to cause it to function in this manner.

The coupling mechanism 16 comprises a sleeve 50 which is splined on the output shaft 12 so as to be shiftable thereon. The sleeve 50 is provided with teeth 51, and these teeth are adapted to engage teeth 52 which are provided on a coupling element 53 splined to the ring gear 45. The internal splines in the member 50 are adapted to engage with teeth 54 provided on the carrier 41. Blocking mechanism 55 is provided for preventing an engagement of the teeth 51 and 52 until the coupling element 53 and output shaft 12 are rotating at substantially the same speeds, and blocking mechanism 56 is provided for performing the same function with respect to the shafts 11 and 12 and the teeth 54 and the splines on the inside of the sleeve 50.

For low and second speeds, the clutch element 50 is shifted into its position in which its teeth 51 inter-engage with the teeth 52 to couple together the ring gear 45 and the output shaft. The brake 48 is engaged to hold the sleeve 38 and its gear 37 stationary for low speed, and the drive is from the input shaft 10 through the centrifugal clutch 13 to the intermediate shaft 11, thereafter through the gearing 15 and the coupling mechanism 16 to the output shaft. The arrangement of the gear set 15 is such that the shaft 12 is driven at a low reduced speed with respect to the shaft 11. For second or intermediate speed ratio, the sleeve 50 remains in the same position as for low speed, the brake 48 is disengaged and the brake 47 is engaged. Such engagement of the brake 47 holds the reaction sleeve 36 and its gear 35 stationary and the drive is through the same group of driving elements as in low speed ratio. However, the gear set 15 functions to drive the shaft 12 at an intermediate but reduced speed with respect to the shaft 11. For direct drive, the sleeve 50 is shifted to bring its internal splines into interengagement with the teeth 54 and the shafts 11 and 12 are thus directly coupled together. For reverse drive the brake 49 is engaged while the sleeve 50 is in the same position as it is for low speed forward drive, while the brakes 47 and 48 are disengaged. The drive through the transmission will be the same as for low speed ratio; however, the planet gear set 15 will function to drive the output shaft 12 at a reduced speed in the reverse direction with respect to the speed and direction of rotation of the intermediate shaft 11.

The illustrated transmission is advantageously of compact construction but yet has the necessary gearing for providing the requisite number of speeds between its input and output shafts. The transmission is simple in construction and may be economically manufactured.

I wish it to be understood that my invention is not to be limited to the specific constructions shown and described, except only insofar as the claims may be so limited, as it will be apparent to those skilled in the art that changes may be made without departing from the principles of the invention.

I claim:

1. In a transmission, the combination of a drive shaft, a driven shaft, a planetary gear set drivingly connectible between said shafts and including two sun gears and a ring gear, a clutch including a shiftable clutch element connected with the driven shaft, said clutch element in one position connecting said driven shaft with said ring gear and in another position directly connecting said shafts for providing a direct drive, a brake for one of said sun gears for providing a low speed power train through said gear set and between said shafts when said clutch is in its first named position, and a brake for the other of said sun gears for completing an intermediate speed power train through said gear set and between said shafts when said clutch is in its first named position.

2. In a transmission, the combination of a drive shaft, a driven shaft, a planetary gear set drivingly connectible between said shafts and including a ring gear, a pair of sun gears, and a dual planet gear including two gears connected together and each drivingly connected with one of said sun gears, a clutch including a shiftable clutch element connected with the driven shaft, said clutch element in one position connecting said driven shaft with said ring gear and in another position directly connecting said shafts for providing a direct drive, a brake for one of said sun gears for completing a low speed power train through said gear set and between said shafts when said clutch is in its first named position, and a brake for the other of said sun gears for completing an intermediate speed power train through said gear set and between said shafts when said clutch is in its first named position.

3. In a transmission, the combination of an input shaft, an output shaft, an intermediate shaft, a friction clutch for connecting said input and intermediate shafts, a planetary gear set drivingly connectible between said intermediate and output shafts and including a ring gear, two sun gears, and a dual planet gear including two gears connected together and each drivingly connected with one of said sun gears, a clutch including a shiftable clutch element connected with the driven shaft, said clutch element in one position connecting said output shaft with said ring gear and in another position directly connecting said intermediate and output shafts for providing a direct drive, a brake for one of said sun gears for providing a low speed power train through said gear set and between said intermediate and output shafts with said second named clutch being in its first named position, a brake for the other of said sun gears for completing an intermediate speed power train through said gear set and between said intermediate and output shafts with said second named clutch in its first named position, and blocker means for preventing a shifting of said second named clutch into either of its engaged positions until there is a synchronization in speed between the elements to be connected thereby.

4. In a transmission, the combination of a drive shaft, a driven shaft, a planetary gear set drivingly connectible between said shafts, said gear set including a dual pinion including two pinions connected together, a pinion in mesh with each of the pinions of the dual pinion, three gears each in mesh with a separate pinion, a clutch including a shiftable clutch element connected with said driven shaft, said clutch element in one position connecting said driven shaft with one of said gears and in another position directly connecting said shafts for providing a direct drive, a brake for another of said gears for completing a low speed power train through said gear set and between said shafts when said clutch is in its first named position, and a brake for the other of said gears for completing an intermediate speed power train through said gear set and between said shafts when said clutch is in its first named position.

5. In a transmission, the combination of a drive shaft, a driven shaft, a planetary gear set drivingly connectible between said shafts, said gear set including a dual pinion comprising two pinions of different diameters connected together, a pinion in mesh with each of said dual pinions, a ring gear in mesh with one of said pinions and two sun gears each in mesh with others of said pinions, a clutch including a shiftable clutch element connected with the driven shaft, said clutch element in one position connecting said driven shaft with said ring gear and in another position directly connecting said shafts for providing a direct drive, a brake for one of said sun gears for providing a low speed power train through said gear set and between said shafts when said clutch is in its first named position, and a brake for the other of said sun gears for completing an intermediate speed power train through said gear set and between said shafts when said clutch is in its first named position.

6. In a transmission, the combination of a drive shaft, a driven shaft, a planetary gear set drivingly connectible between said shafts, said gear set including a dual pinion comprising a large pinion and a small pinion connected together, a large pinion in mesh with said first named large pinion and a small pinion in mesh with said first named small pinion, a ring gear in mesh with one of said large pinions, a sun gear in mesh with the other of said large pinions and a sun gear in mesh with one of said small pinions, a clutch including a shiftable clutch element connected with the driven shaft, said clutch element in one position connecting said driven shaft with said ring gear and in another position directly connecting said shafts for providing a direct drive, a brake for said last named sun gear for completing a low speed power train through said gear set and between said shafts when said clutch is in its first named position, and a brake for the other of said sun gears for completing an intermediate speed power train through said gear set and between said shafts when said clutch is in its first named position.

7. In a transmission, the combination of a drive shaft, a driven shaft, a planetary gear set drivingly connectible between said shafts, said gear set including a dual pinion comprising a large pinion and a small pinion connected together, a large pinion in mesh with said first named large pinion and a small pinion in mesh with said first named small pinion, a carrier for said pinions, a ring gear in mesh with a large one of the pinions and a sun gear in mesh with the other of said large pinions, a sun gear in mesh with one of the small pinions, said drive shaft being connected with said carrier, a clutch including a shiftable clutch element connected with the driven shaft, said clutch element in one position connecting said driven shaft with said ring gear and in another position directly connecting said shafts for providing a direct drive, a friction brake for said last named sun gear for completing a low speed power train through said gear set and between said shafts when said clutch is in its first named position, a friction brake for the other of said sun gears for completing an intermediate speed power train through said gear set and between said shafts when said clutch is in its first named position, and blocker means for preventing a shift of said clutch into either of its engaged positions until there is a synchronization of the elements to be coupled together.

8. In a transmission, the combination of an input shaft, an output shaft, an intermediate shaft, a friction clutch for connecting said input and intermediate shafts, a one-way clutch operatively connected between said input shaft and said intermediate shaft and operative only when the intermediate shaft drives the input shaft in the forward direction, a planetary gear set drivingly connectible between the intermediate and output shafts, said gear set comprising a dual pinion comprising a large and a small pinion connected together, a large pinion in mesh with said first named large pinion and a small pinion in mesh with said first named small pinion, a carrier for said pinions and connected with said intermediate shaft, a ring gear in mesh with one of the large pinions and a sun gear in mesh with the other of the large pinions, a sun gear in mesh with one of the small pinions, a positive type clutch including a shiftable clutch element connected with the driven shaft, said clutch element in one position connecting said output shaft with said ring gear and in another position directly connecting said intermediate and output shafts for providing a direct drive, a friction brake for said last named sun gear for completing a low speed power train through said gear set and between said intermediate and output shafts when said positive type clutch is in its first named position, a friction brake for the other of said sun gears for completing an intermediate speed power train through said gear set and between said intermediate and output shafts when said positive type clutch is in its first named position, and blocker means for preventing movement of said positive type clutch into either of its engaged positions until there is a synchronization of the elements to be coupled together.

9. In a transmission, the combination of a drive shaft; a driven shaft; a planetary gear set drivingly connectible between said shafts for producing low speed, intermediate speed and reverse power trains and including a plurality of elements; a clutch including a shiftable clutch element connected with one of said shafts, said clutch element having a set of teeth in one position connecting said last-mentioned shaft with an element of said gearing for transmitting the drive during the completion of said low speed, intermediate speed or reverse power train through the gearing and in another position directly connecting said shafts for providing a direct drive; and a plurality of brakes selectively controlling other elements of said gearing for completing the low speed power train between said shafts, the intermediate speed power train between said shafts, or the reverse power train for driving said driven shaft in a direction reverse to that of the drive shaft, when said clutch is in its first-named position.

10. In a transmission, the combination of a drive shaft, a driven shaft, a planetary gear set drivingly connectible between said shafts including two sun gears and two ring gears, a clutch including a shiftable clutch element connected with the driven shaft, said clutch element in one position connecting said driven shaft with one of said ring gears and in another position directly connecting said shafts for providing a direct drive, a brake for one of said sun gears for providing a low speed power train through said gear set and between said shafts when said clutch is in its first-named position, a brake for the other of said sun gears for completing an intermediate speed power train through said gear set and between said shafts when said clutch is in its first-named position, and a brake for the other of said ring gears for completing a power train through said gear set and between said shafts for driving said driven shaft in a reverse direction to that of said drive shaft when said clutch element is in its first-named position.

11. In a transmission, the combination of a drive shaft, a driven shaft, a planetary gear set drivingly connectible between said shafts and including a pair of ring gears, a pair of sun gears, and a dual planet gear including two gears connected together and each drivingly connected with one of said sun gears, a clutch including a shiftable clutch element connected with the driven shaft, said clutch element in one position connecting said driven shaft with one of said ring gears and in another position directly connecting said shafts for providing a direct drive, a brake for one of said sun gears for completing a low speed power train through said gear set and between said shafts when said clutch is in its first-named position, a brake for the other of said sun gears for completing an intermediate speed power train through said gear set and between said shafts when said clutch is in its first-named position, and a brake for the other of said ring gears for completing a power train through said gear set and between said shafts for driving said driven shaft in a reverse direction to that of said drive shaft when said clutch is in its first-named position.

12. In a transmission, the combination of a plurality of shafts; a planetary gear set drivingly connectible between said shafts and including a ring gear element, a pair of sun gear elements, a planetating spool having gear teeth drivingly connected with said sun gear elements, and a carrier element for said spool; means including a positive clutch having a shiftable clutch member connected with one of said shafts and connectible with one of said gear elements for conditioning said gear set to provide a low speed power train, an intermediate speed power train, or a reverse drive power train, through said gear set and between said shafts; and a plurality of engaging devices for selectively controlling certain of said elements to alternately complete said power trains when said shiftable clutch member is connected with said one gear element.

13. In a transmission, the combination of a drive shaft; a driven shaft; an intermediate shaft; a friction clutch drivingly connecting said drive and intermediate shafts, a planetary gear set drivingly connectible between said intermediate and driven shafts and including a ring gear element, a pair of sun gear elements, a planetating spool having gear teeth drivingly connected with said sun gear elements, and a carrier element for said spool; a positive clutch including a shiftable clutch member connected with one of said shafts and connectible with one of said gear elements for conditioning said gear set to provide a low speed power train, an intermediate speed power train, or a reverse drive power train between said intermediate and driven shafts; and a plurality of brakes for selectively restraining rotation of certain of said elements to provide either of said power trains when said clutch member is connected to said one gear element.

14. In a transmission, the combination with a drive shaft; a driven shaft; a planetary gear set drivingly connectible between said shafts and including two sun gears, a ring gear, planet pinions in mesh with said sun gears, a planet spool having gear teeth in mesh with said planet pinions and said ring gear, a carrier for said planet gears and spool; a positive clutch including a shiftable clutch element connected with one of said shafts and connectible with one of said gears for conditioning said gear set to provide a low speed power train, an intermediate speed power train, and a reverse drive power train through said gear set and between said shafts; and brake means selectively controlling certain of said gears to establish either of said power trains when said clutch element is connected to said one gear.

15. In a transmission, the combination of a drive shaft, a driven shaft, a planetary gear set drivingly connectible between said shafts for producing low speed, intermediate speed and reverse power trains and including a plurality of elements, a clutch including a shiftable clutch element connected with the driven shaft, said clutch element having a set of teeth in one position connecting said driven shaft with an element of said gear set for transmitting the drive during the completion of said low speed, intermediate speed or reverse power train through said gear set and in another position directly connecting said shafts for providing a direct drive, a brake for one element of the planetary gear set for completing the low speed power train through said gear set and between said shafts with said clutch being in its first-named position, a second brake for another element of said planetary gear set for completing the intermediate speed power train through said gear set and between said shafts with said clutch being in its first-named position, and a brake for a third element of said gear set for completing the reverse power train through said gear set and between said shafts for driving said driven shaft in a direction reverse to that of said drive shaft when said clutch is in its first-named position.

16. In a transmission, the combination of a drive shaft, a driven shaft, a planetary gear set drivingly connectible between said shafts for producing low speed, intermediate speed and reverse power trains and including a plurality of elements, a clutch including a shiftable clutch element connected with the driven shaft, said clutch element having a set of teeth in one position connecting said driven shaft with an element of said gear set for transmitting the drive during the completion of said low speed, intermediate speed or reverse power train through said gear set and in another position directly connecting said shafts for providing a direct drive, a brake for an element of said gear set for completing the low speed power train through the gear set and between said shafts with said clutch being in its first-named position, a second brake for another element of said gear set for completing the intermediate speed power train through said gear set and between said shafts with said clutch being in its first-named position, blocker means for preventing movement of said clutch into either of its engaged positions until the members to be connected are in synchronization during establishment of said power trains and direct drive, and a brake for a third element of said gear set for completing the reverse power train through said gear set for driving said driven shaft in a direction reverse to that of said drive shaft when said clutch is in its first-named position.

DONALD W. KELBEL.

REFERENCES CITED

The following references are of record in the file of this patent:

UNITED STATES PATENTS

| Number | Name | Date |
| --- | --- | --- |
| 879,086 | Coffee | Feb. 11, 1908 |
| 980,407 | Clarke | Jan. 3, 1911 |
| 1,092,438 | Fitch | Apr. 7, 1914 |
| 1,348,095 | Dickman | July 27, 1920 |
| 2,146,369 | Dodge | Feb. 7, 1939 |
| 2,210,668 | Hopkins | Aug. 6, 1940 |
| 2,311,209 | Carnagua | Feb. 16, 1943 |